(12) United States Patent
Bliss et al.

(10) Patent No.: US 8,041,506 B2
(45) Date of Patent: Oct. 18, 2011

(54) MAPPING IN MOBILE DEVICES

(75) Inventors: Adam Bliss, Berkeley, CA (US); Mark Crady, Palo Alto, CA (US); Michael Chu, Los Altos Hills, CA (US); Scott Jenson, Edina, MN (US); Sanjay Mavinkurve, East Palo Alto, CA (US); Joshua J. Sacks, San Carlos, CA (US); Jerry Morrison, Mountain View, CA (US)

(73) Assignee: Google Inc., Mountain View, CA (US)

(*) Notice: Subject to any disclaimer, the term of this patent is extended or adjusted under 35 U.S.C. 154(b) by 1173 days.

(21) Appl. No.: 11/557,456

(22) Filed: Nov. 7, 2006

(65) Prior Publication Data

US 2007/0176796 A1   Aug. 2, 2007

Related U.S. Application Data

(60) Provisional application No. 60/734,675, filed on Nov. 7, 2005.

(51) Int. Cl.
*G01C 21/30* (2006.01)
(52) U.S. Cl. ........ 701/208; 701/211; 701/214; 701/217; 701/117; 701/118; 340/901; 340/905; 340/995.1; 340/988; 709/224
(58) Field of Classification Search .................. 701/208, 701/211, 214, 117, 118, 119; 340/901, 905, 340/995.1, 915.14, 988; 342/357.13; 709/224
See application file for complete search history.

(56) References Cited

U.S. PATENT DOCUMENTS

| 5,848,373 | A | * | 12/1998 | DeLorme et al. | 701/200 |
| 5,884,219 | A | * | 3/1999 | Curtwright et al. | 701/213 |
| 5,948,040 | A | * | 9/1999 | DeLorme et al. | 701/201 |
| 6,199,015 | B1 | * | 3/2001 | Curtwright et al. | 701/213 |
| 6,314,370 | B1 | * | 11/2001 | Curtright | 701/213 |
| 6,321,158 | B1 | * | 11/2001 | DeLorme et al. | 701/201 |
| 6,694,253 | B2 | * | 2/2004 | Schroeder | 701/208 |
| 6,731,316 | B2 | | 5/2004 | Herigstad et al. | |
| 6,873,329 | B2 | * | 3/2005 | Cohen et al. | 345/501 |
| 7,142,205 | B2 | * | 11/2006 | Chithambaram et al. | 345/418 |
| 7,446,783 | B2 | * | 11/2008 | Grossman | 345/660 |
| 7,483,025 | B2 | * | 1/2009 | Roy et al. | 345/440 |

(Continued)

FOREIGN PATENT DOCUMENTS

EP   1571536   9/2005

(Continued)

OTHER PUBLICATIONS

Supplementary European Search Report, Application No. EP 06 83 7145 dated Dec. 7, 2009, 175 pages.

(Continued)

*Primary Examiner* — James Trammell
*Assistant Examiner* — McDieunel Marc
(74) *Attorney, Agent, or Firm* — Fish & Richardson P.C.

(57) ABSTRACT

A computer-implemented mapping method is disclosed and includes displaying a first map view of a geographic area on a display of a computing device, receiving a voice or keypress zoom command and generating a first zoom box of a predetermined size on the display relative to the first map view in response to the zoom command, and displaying a second map view of a zoomed geographic area corresponding to the zoom box.

30 Claims, 17 Drawing Sheets

U.S. PATENT DOCUMENTS

| | | | |
|---|---|---|---|
| 7,599,790 B2* | 10/2009 | Rasmussen et al. | 701/208 |
| 2002/0091568 A1* | 7/2002 | Kraft et al. | 705/14 |
| 2003/0038787 A1 | 2/2003 | Nishiyama | |
| 2004/0030493 A1 | 2/2004 | Pechatnikov et al. | |
| 2004/0051695 A1 | 3/2004 | Yamamoto et al. | |
| 2004/0090950 A1* | 5/2004 | Lauber et al. | 370/352 |
| 2004/0203901 A1 | 10/2004 | Wilson et al. | |
| 2005/0027705 A1 | 2/2005 | Sadri et al. | |
| 2005/0197763 A1 | 9/2005 | Robbins et al. | |
| 2005/0202831 A1 | 9/2005 | Sudit | |
| 2005/0228860 A1 | 10/2005 | Hamynen et al. | |
| 2006/0089793 A1* | 4/2006 | Rudow et al. | 701/208 |
| 2007/0032945 A1* | 2/2007 | Kaufman | 701/208 |
| 2007/0064018 A1* | 3/2007 | Shoemaker et al. | 345/660 |
| 2007/0118520 A1* | 5/2007 | Bliss et al. | 707/5 |
| 2008/0278311 A1* | 11/2008 | Grange et al. | 340/539.2 |

FOREIGN PATENT DOCUMENTS

| | | |
|---|---|---|
| WO | WO 01/63392 | 8/2001 |

OTHER PUBLICATIONS

"Explore Google Maps" [online] [retrieved from the internet] http://web.archive.org/web/20050801013832/http://www.google.com/help/maps/tour (Aug. 1, 2005) pp. 1-8.

* cited by examiner

MAPPING IN MOBILE DEVICES

CROSS REFERENCE TO RELATED APPLICATION

This application claims the benefit of U.S. Provisional Patent Application No. 60/734,675, filed Nov. 7, 2005, and entitled "Local Search and Mapping for Mobile Devices", the contents of which are hereby incorporated by reference.

TECHNICAL FIELD

This description relates to user interfaces, and more particularly to generating customized graphical user interfaces for mobile computing devices.

BACKGROUND

Handheld mobile devices, such as cellular telephones and personal digital assistants (PDAs), are becoming increasingly powerful both in terms of processing power and the ability to provide access to data. The usefulness of these enhancements is often limited, however, by an inability of mobile devices to display data effectively due to the small size of the display, to the limited bandwidth available for wirelessly delivering data, and to mobile device's limited memory resources relative to laptop and desktop computers.

There are beginning to be some applications that are specifically designed for handheld mobile devices. Many such applications are based on application development platforms also specifically designed for mobile devices, such as Java 2 Platform Micro Edition (J2ME) and Binary Runtime Environment for Wireless (BREW). Some applications that are designed for retrieving data from a remote location to a handheld mobile device are browsers that correspond to conventional browser applications in that they enable users to enter uniform resource locators (URLs) to retrieve information from any internet web site. Other applications enable data to be retrieved by launching a separate browser application in response, for example, to selecting a hyperlink in a user interface. In addition, specialized, limited functionality applications are available that provide a mechanism to access data from dedicated application service providers.

One useful application for mobile devices is that of "local search." Such an application allows a user to specify a particular geographic location or area when submitting a search so that the search results relate to that location or area. For example, a user may enter "dim sum restaurants 56523" to be provided a list of all dim sum restaurants in the 56532 zip code. Or the user might submit "hotels near LAX" to receive a list or map showing all hotels near Los Angeles International airport. Such local search can be particularly helpful to users of mobile devices because they are often looking for information about things around them, e.g., attempting to find directions, from their car, to a particular store or building. Thus, there is a need for computer programs or interfaces that provide users with convenient access to information and useful presentation of that information.

SUMMARY

In general, this document relates to methods and systems for allowing users of mobile devices having, for example, relatively small screens and slow data transmission rates (or high latency) to interact with those devices in a convenient and helpful manner. As one example, a user can be provided with convenient approaches for panning and zooming a view such as a map. The user may also be provided with techniques for displaying and interacting with local search results. Moreover, the user may be provided with techniques for generating directions for a travel route, and for interacting with the direction information.

In one implementation, a computer-implemented mapping method is disclosed. The method comprises displaying a first map view of a geographic area on a display of a computing device, receiving a voice or key-press zoom command and generating a first zoom box of a predetermined size on the display relative to the first map view in response to the zoom command, and displaying a second map view of a zoomed geographic area corresponding to the zoom box. The second map view may have a different resolution than the first map view. Also, the first and second map view may be comprised of tiles of raster images.

In some aspects, the method further comprises retrieving tiles of the zoomed geographic area and replacing the display with the retrieved tiles. The second map view may be a zoomed-in view of the first map view. Also, the zoom box may comprise an outline superimposed inside the edges of the first map view. The zoom command may also be received by activation of a key on a telephone device. In addition, the method may comprise receiving a movement key activation and panning the zoom box over the first map view in a direction corresponding to the activated movement key. The activated key may comprise a key aligned with a changeable region of a display on the computing device.

In other aspects, the second map view may be a zoomed-out view of the first map view. The zoom box may also comprise the first map view displayed as a reduced image centered in the display. In addition, a display area around the reduced image may comprise a featureless background. In other aspects, the method may further comprise generating a second zoom box on the second map view and displaying a third map view of a zoomed geographic area corresponding to the second zoom box.

In another implementation, the document discloses a tangible media carrying instructions that, when executed, perform certain steps. The steps may include displaying a first map view of a geographic area on a display of a computing device, receiving a voice or key-press zoom command and generating a zoom box of a predetermined size on the display relative to the first map view in response to the zoom command, and displaying a second map view of a zoomed geographic area corresponding to the zoom box. The steps may further comprise retrieving map tiles, each map tile representing a portion of the zoomed geographic area, and replacing the display with the retrieved tiles. In addition, the zoom box comprises an outline superimposed inside the edges of the first map view.

In yet another implementation, a mobile computer-implemented mapping system is disclosed. The system comprises an interface to receive location information and to provide, in response, corresponding map information, map tile storage holding a plurality of tiles for display with the interface, and means for changing map information displayed by the interface in response to inputs by a user to a mobile device.

The details of one or more embodiments are set forth in the accompanying drawings and the description below. Other features, objects, and advantages of the will be apparent from the description and drawings, and from the claims.

DESCRIPTION OF DRAWINGS

Like reference symbols in the various drawings indicate like elements.

DETAILED DESCRIPTION

Figure 1:
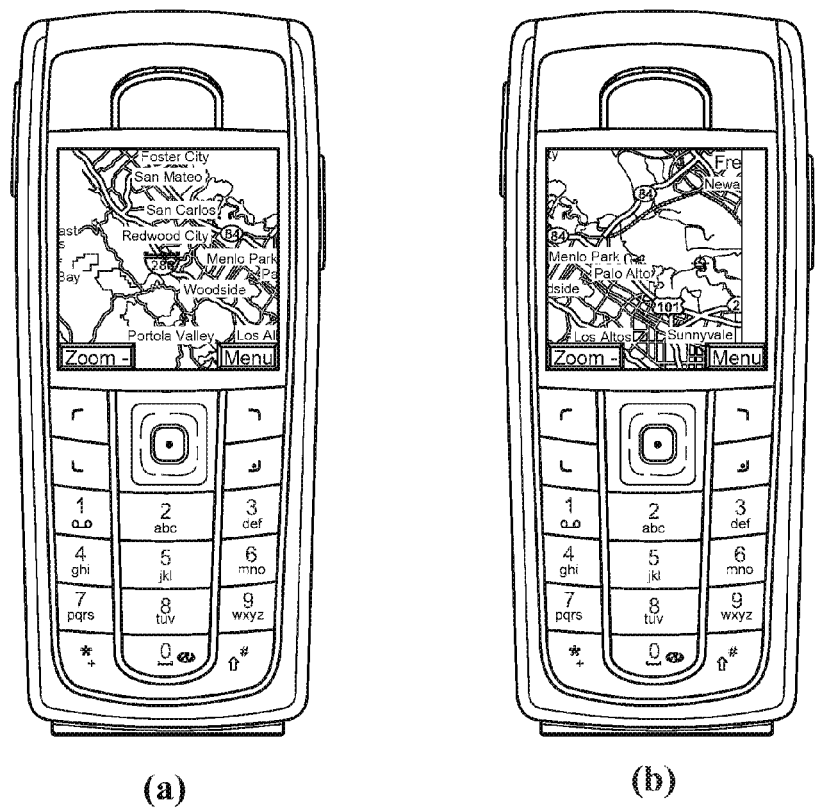
FIG. 1 shows displays for a panning operation on a mobile device.

FIG. 1 shows displays for a panning operation on a mobile device. View (a) shows a device having a map displayed on it. The map provides a view at a certain level of zoom of a geographic area—here centered around Redwood City, Calif. A user may pan on the map by using a multi-direction selection key, such as that shown in the middle of the device (e.g., cellular telephone) in the Figure. Specifically, such a key may allow a user to press on its upper portion to move up, on its right to move right, etc. In this manner, the key can operate much like a flat joystick. Numeric keys on the device may also be used for moving, such as the 6 key to move right, the 4 key to move left, etc. Other input mechanisms for panning, including voice input, may also be used as appropriate.

When a user selects to pan the map in a particular direction, the map may be regenerated in a number of ways. As one example, the map may be comprised of a number of pre-composed tiles that are in the form of raster images. A displayed map may be made up of the tiles around the center of the map sufficient to fill the display and perhaps extend somewhat beyond the display. The device may then move these tiles in unison when a user requests a pan, so that the full image of the map moves smoothly. The panning motion for each press of a key may be indexed to a particular distance, such as a single row of tiles or a portion of a row of tiles.

If the user pans beyond the extent of available tiles, the map may be temporarily displayed with the area for those tiles blank, as shown in view (b) in FIG. 1, along the right edge of the display, where the user has panned to the right from view (a). Each of the missing tiles may then be acquired, such as by downloading from a remote server, in a predetermined manner so as to fill in the blank remaining in the map while the viewer waits. In this manner, the viewer may still see all of the original map information in detail throughout the download process, which may be preferable to wholly regenerating an entirely new display for which the user will have to wait—particularly on mobile devices having long latency times.

In addition, by using tiles, panning may occur through methods other than simply erasing a prior map and replacing it with a wholly new map that has "jumped" over a predetermined distance. For example, when a user moves a certain direction, crosshairs that represent the desired location—typically the center of the map—may jump to the new panned-to location, and the map may then slide smoothly (e.g., in an animated manner) over until the cross hairs are again in the middle of the display. During or after the adjustment, additional tiles may be downloaded or loaded from a cache as necessary.

Smooth map scrolling may also occur by moving the map as long as a user holds down a directional button rather than having the map jump in large increments. The speed of the pan may be pre-set, set by the user, or may be a function of how long the button has been held down (with faster panning the longer the button has been held down, either as a step-function increase in speed, a linear increase in panning speed, or some other functional relationship of speed to time-held). Panning may also occur by moving the map in larger incremental jumps (i.e., to the new location), with the crosshairs staying in the middle of the display. For flexibility, the type of scanning may be selected, such as based on a device performance rating (e.g., fixed when the device or application is deployed), an option available to the user, or set dynamically based on measured performance.

Additional tiles may also be downloaded around those displayed on a map and cached in local memory on the device. In this manner, a user can pan around an initial image to a limited extent without forcing the download of additional tiles. In other words, the amount of map display stored on a device may extend beyond the edges of the actual display so that small motions can be conducted without the need for downloads, and also so that more of the map can be seen by the user even before additional tiles are downloaded.

The tiles may also differ from each other based on the zoom level at which a user is viewing the map. In particular, an entire map, e.g., of the United States, may be displayed using multiple layers of tiles. The highest layer would have very few tiles, which might simply be rendered with state lines on them. At a closer zoom level, regional details such as counties or interstate highways may be shown, and additional tiles will likewise be provided. At a closer level that may involve thousands or millions or more of tiles, individual streets may be shown. Each layer may have its own set of tiles, rendered at a particular resolution for the map, with each closer level having more resolution and more tiles.

The display may be generated using dynamic download of map tiles, and caching of tile information. Such an approach is disclosed more fully in co-pending U.S. application Ser. No. 11/051,534, which is herein incorporated by reference in its entirety.

Also, FIG. 1 shows the use of certain softkeys, which may be keys whose changing functions are indicated by a changing display. In FIG. 1, the softkeys are located in the upper corners of the keypad, and correspond to a "zoom" feature (which is shown as "zoom –" to indicate that pressing the key will zoom out) and a "menu" feature (which will raise a menu of choices on the display), though other appropriate features may be provided. Other possible softkeys will be apparent from the remaining figures. The softkeys are intuitively coupled to the on-screen selections by virtue of their physical alignment with the selections (e.g., directly under the selections). In FIG. 1, the softkeys permit the invocation of a zoom function (left key), as described below, and also permit a user to call up a menu containing a plurality of menu choices (right key).

The maps provided for display on a mobile device may differ from those normally provided to full-featured desktop computers. For example, because mobile displays generally have a limited display area, street names and other identifiers may be repeated more often to ensure that they will be shown on a smaller display. In addition, different colors may be used to accommodate displays having lesser color depth than those of full-featured computers.

Figure 2A:
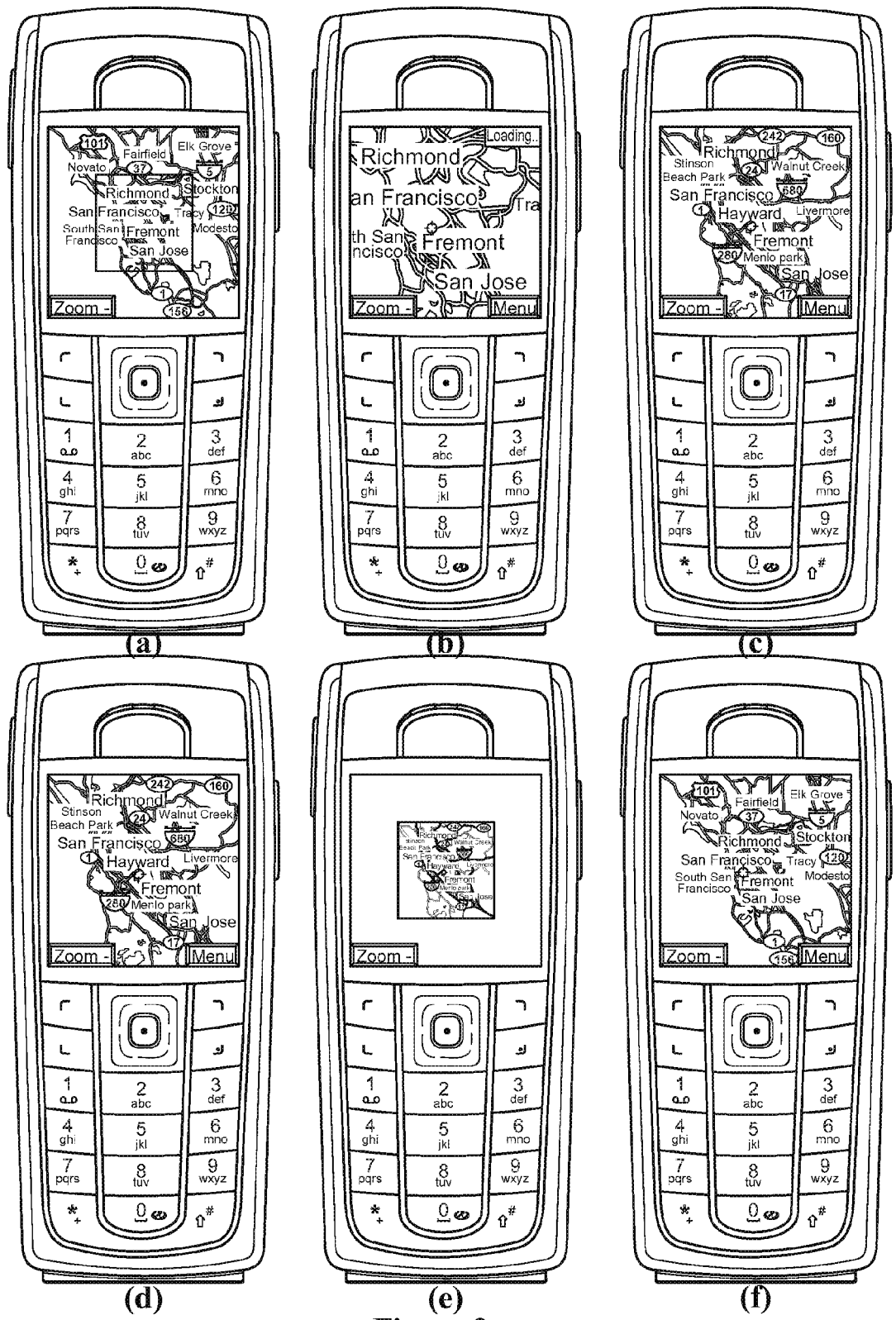
FIGS. 2a-2b show displays for a zooming operation on a mobile device.
Figure 2B:
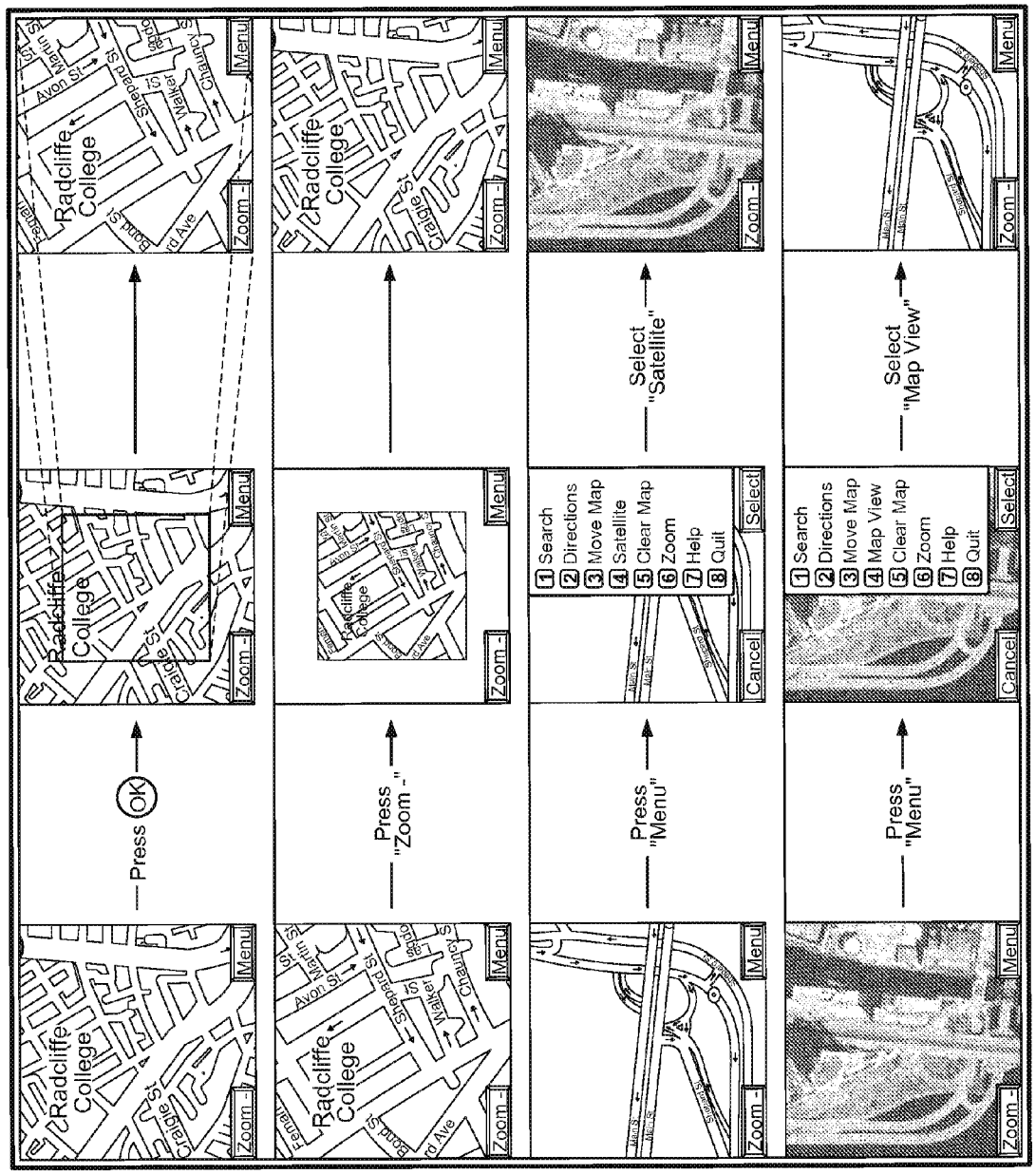

FIGS. 2a-2b show displays for a zooming operation on a mobile device. A map may be displayed initially at a particular zoom level that may be preset, determined by the device, or determined by a remote system, such as a server that stores and provides tiles in response to requests from devices. For example, where a search is a local search that includes a zip code or area code, the zoom level may be selected so that the area displayed with the map approximates the reach of the area code. Also, where a map is returning search results, the zoom level may be set just wider than the extent of the search results, so that all results can be seen, but the results are as zoomed-in as is practical.

A user may then zoom in or out on the display, such as a map. In FIG. 2, the "zoom out" command is represented by the left softkey denoted as "zoom –" (but which could also be denoted as "zoom out"). The right softkey may then be the "zoom +" or "zoom in" key, though it is not labeled as such in the Figure. The zoom in key may also be an "OK" key on the keypad, such as a key in the middle of the selection key. Other keys may also represent zooming functions, and zooming may occur as part of a broader course of actions by a user, rather than simply being an isolated command. For example, softkeys for zooming may be displayed only after certain menu selections are made with respect to a mapping application, or such softkeys may be displayed automatically in appropriate contexts.

As shown in view (a) of FIG. 2(a), zooming in is aided by the use of a zoom box, which is simply an outline that approximates the shape of the device display and circumscribes the area that will be shown after the zooming in has occurred. The zoom box may also comprise a shaded area or other appropriate visual indicator of the zoomed in area. An initial zoom box is shown if the user selects "zoom in" once, and boxes of decreasing size, representing further zoom levels, may be displayed as the user presses the key additional times. Subsequent pressing of a "zoom out" key after the pressing of a "zoom in" key may cause the zoom box to get larger as it steps back through wider zooms, and may ultimately result in zooming out (described below) when the zoom box fills the display.

A user may also move the zoom box around the display, such as by using directional keys (e.g., the control pad or the 2-4-6-8 keys). For example, if a user wants to zoom in on a small area in the upper right-hand corner of a currently-displayed map, the user may first press a "zoom in" key as many times as the user prefers, and then may press "right" and "up" directional keys to move the zoom box over the desired area. Such movement may occur in jumps or as smooth panning of the zoom box, e.g., by animating movement of the zoom box an index distance each time a directional key is pressed.

A user may begin the process of displaying the zoomed-in display by pressing an appropriate execution key. For example, the user may press the middle of the selection key. In addition, the regeneration process may be triggered by a delay, such as the passage of several hundred milliseconds after a user has last pressed a zooming-related key.

To make the zooming appear relatively smooth, the image may be regenerated in a number of ways. For example, the portion of the image inside the zoom box may be initially expanded to fill the entire display, but in less-than-desired (but perhaps smoothed or anti-aliased) resolution. The user may then be provided the opportunity to view this image while more detailed information is retrieved for the zoomed-in display. The more detailed information may include tiles providing a closer view of the portion of the prior map.

The transition from the original map to the zoomed-in map may occur by any appropriate mechanism. For example, the original, lower-resolution portion of the initial map may be shown across the display, or may be gradually increased in size (with appropriate anti-aliasing or other up-converting technique to compute the appropriate pixel values at each size of the image) until it is shown across the display. Once it has taken full size, the more detailed image may begin to replace it, such as by overwriting with scattered pixels from the more detailed image until the whole image is displayed, or through other known approaches to transitioning from lower-resolution to higher-resolution images. In addition, map information may be layered, so that a map image is added at a different time or a different rate than are street names and other similar map labels.

Zooming out may also occur in a manner similar to that of zooming in, and is shown in views (d) through (f). When the user selects a "zoom out" key, the map being displayed (view (d)) may be made smaller in size with blank space around it (view (e)). If the user presses "zoom out" again, the image may become smaller yet, to a maximum distance of zooming out. Also, if the user then presses a "zoom in" key, the image may get larger until it fills the display, and the device may then show zoom boxes as rectangles of decreasing size on the map. View (f) shows the result of zooming out one degree from the display of view (d).

Though not shown, the user may also move the zoom box for zooming out, so that the new display is not based on the same center point as the old display. Specifically, directional keys may be used to move the box, which may take the form of an outline, as with the zoom box for zooming in. When the box is moved a particular direction after a zoom out key has been selected, the image may be left centered on the screen (as in view (e)), but the outline may move around the image and into the blank space around it. If the device contains image data for such an area (e.g., the remainder of image tiles around the edge of the initial display), that data may be displayed as the zoom box moves. Also, lower-resolution around the edge of the initial display may also be shown.

The blank area around the display may take on a variety of forms. For example, it may be a simple solid color for simplicity. It may also be a "background" or "wallpaper" image, so as to provide the user with the sense that the image is simply layered on top of the device's standard desktop, such as in the form of a simple widget. In addition, the area may be provided with logos or other promotional material, including material relevant to the location being shown, and may be displayed as part of a program such as the known AdWords or AdSense programs from Google.

The zoomed-out display may be generated from the initial display in manners similar to that for the zoomed in display above. For example, the initial, but shrunken, view may be first displayed, including in a lower resolution than originally displayed, and new images (e.g., in the form of tiles) may be padded around it as they are received. The initial view may stay in the middle, or may ultimately be replaced by a new image for that area, so as to better coordinate with the new images around it (e.g., if street names or other labels are provided in different locations for different zoom levels).

Figure 3A:
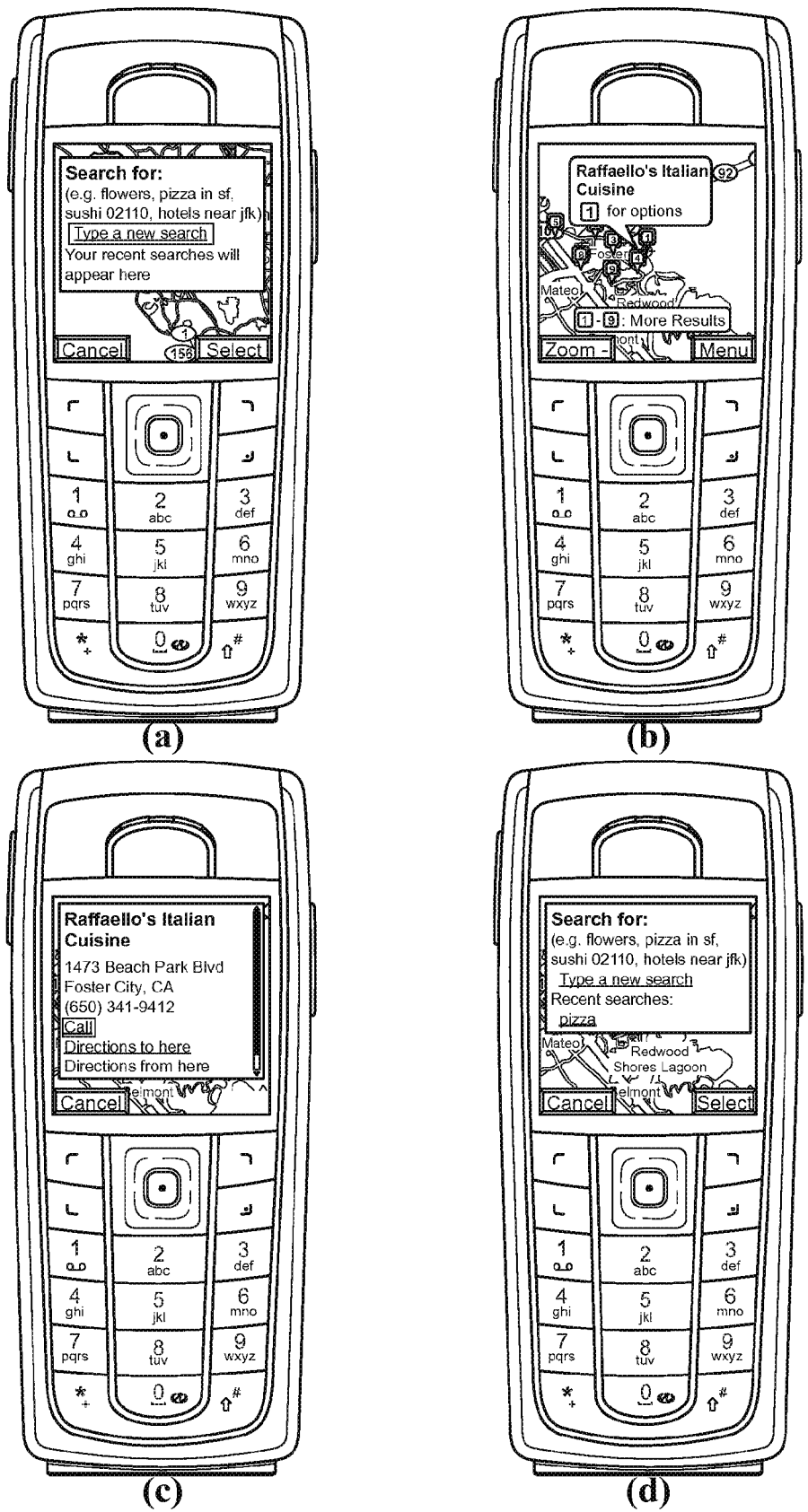
FIGS. 3a-3b show displays for a local searching operation on a mobile device.
Figure 3B:
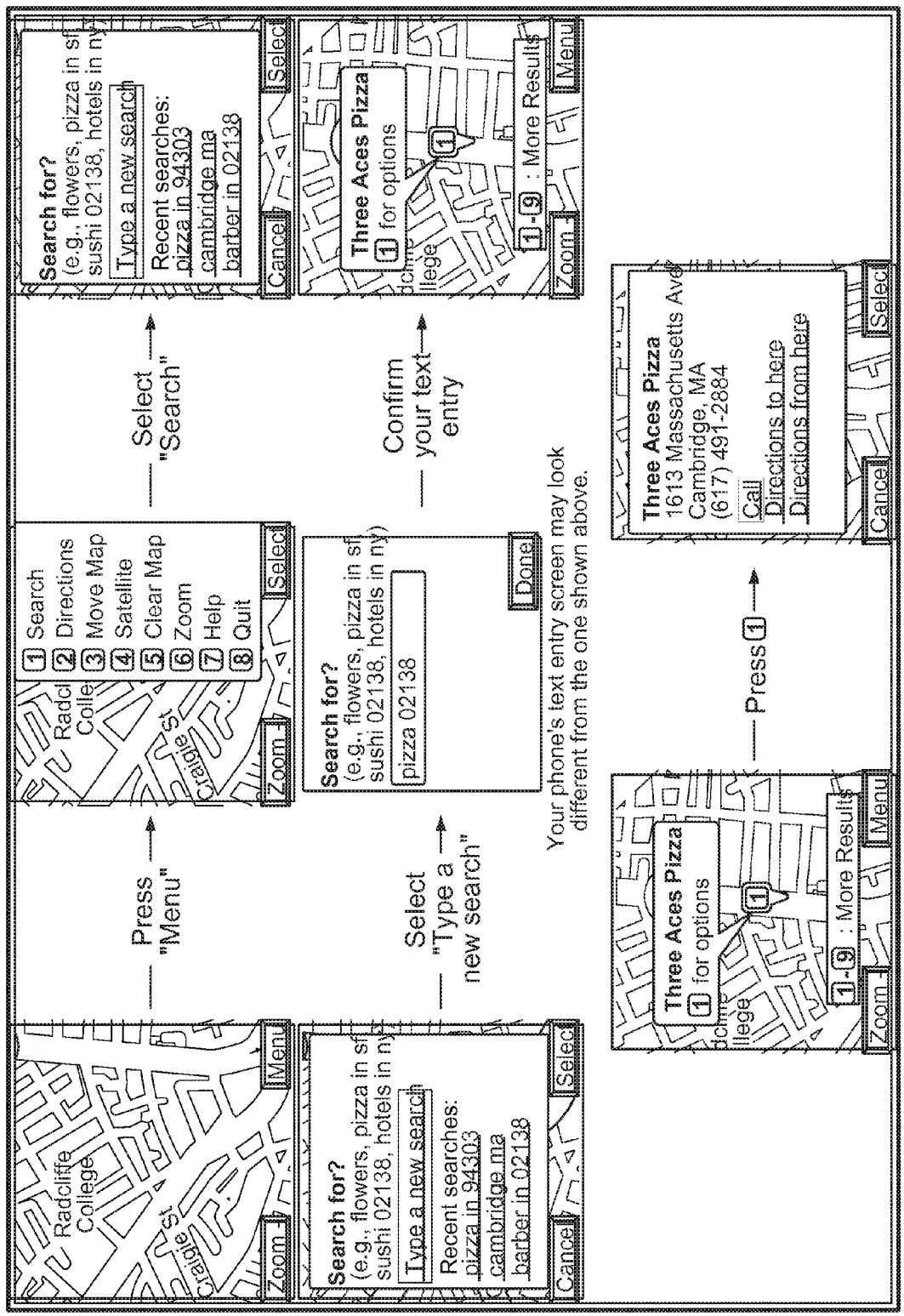

FIGS. 3a-3b show displays for a local searching operation on a mobile device. Searching on the device may employ a standard search system on a server, such as the Google Local service. The information retrieved may be specially formatted for mobile display, such as by a webserver connected to the search backend, but configured to provide information particularly well-suited for display on a mobile device (e.g., search results responsive to a query, but relating to a particular town or zip code). View (a) in FIG. 3a shows a local search input box, along with examples of formats that a search may take. When the search input box is displayed, the softkeys may change to reflect activities that are helpful in the entry of data to the search input box.

The user may enter a search request by selecting the "type a new search" hyperlink from the initial view (view (a)), which causes the device to show an empty search input box (not shown). The user may enter a search request that includes location information, such as a zip or area code or other information such as "hotels near jfk" or "pizza in sf." In such a situation, the server that receives the request will parse out and identify the location information, and the search will be conducted around that location. The user may also enter a search request without location information, such as "dim sum," "flowers," or "U Haul." In such a situation, the local search may be performed on the area shown on the map when the search is performed, or may be based on a centerpoint that is the centerpoint of the map (but perhaps covering an area smaller or larger than that shown in the map). In addition, a location may be assigned for a user to be applied across all searches, or a location may be determined by the device, such as through GPS measurement. The search box may be incorporated directly into the search dialog box also.

A user may then submit the search request, such as by pressing the equivalent of an "enter" key (e.g., pressing the center of a control pad). The request, with appropriate identifying and other information, may then be transmitted to a remote system, such as a local search server system. That system may recognize the request as coming from a mobile device, and may format the information accordingly, but may otherwise perform the search as any other local search. For example, the system may return information for nine hits so as to correspond to selections that may be made using the nine positive integers on a typical telephone keypad. (A tenth result may be provided for the 0 key also).

Such search results are shown in view (b) of FIG. 3a, where the search term was "pizza." Here, the results are shown in a manner common to Google Local search, with pin icons representing search results. Each pin icon is shown located approximately over the location of the result (e.g., the address of a restaurant or other business), like a push-pin in a map.

Each pin is also given a number that is associated with a key on the keypad. Pressing the associated key once will cause summary information for the search result to be displayed, such as the business name, as shown in view (b). The zoom level may be selected so as to avoid getting more than 9 or 10 results, which could not be easily identified with a mobile device keypad. Where additional results exist outside the bounds of the display (e.g., because there are many results or because the user was zoomed in very tightly and display of the search results did not change the zoom level), other selections may be provided to the user for viewing other search results, such as is shown in view (b). Various actions may be taken on the information. For example, a user may press the "send" or similar button on their device to make a telephone connection with the search result-a click to dial transaction.

Also, with mobile devices having small sizes and a limited number of input keys, it may be preferable only to display a smaller number of results on a map at a time to provide for easier viewing and interaction by a user. Where there are additional "hits" in the area searched, the display may provide some indicator of the presence of those hits located off the initial display. For example, an icon (not shown) could be displayed at each edge of the display where there are additional hits off that side of the display. Likewise, icons may be shown in the corners when the hits are located diagonally from the displayed initial map (e.g., providing eight directions of possible indicators).

The icons may be similar to the pins that represent hits on a full desktop display, such as for a desktop computer. For example, the icons may simply be circles like the pins, but without extensions below them toward the map, so as to indicate that they represent hits just as the pins represent hits, but that they are not located over their respective hits. The icons may also take on a different color than the pins so as to distinguish them, may be provided with additional indicators such as arrows attached to or wrapped around the pin heads, and may also be provided with a number that may or may not correspond to a key on the device's keypad. For example, the number may correspond to the number of hits located in the direction of the icon. As such, the user may be apprised that panning in a particular direction is more likely to be successful than panning in another direction. Such additional direction may be particularly valuable to a user of a mobile device because such a user may not be able to see very much at one time, and may also have much less bandwidth, so that the user has a need to pan more often but more efficiently also.

Movements with the device may also occur in a manner that appears to a user as animated. For example, tiles may be moved smoothly across a display from one panning position to another or from a small zoomed-out or zoomed in display to smoothly enlarge to the post-zoom display size. In addition, when search results are provided, panning toward a result may cause the display to snap to the next result, either immediately upon entry of a pan command, or when the result is sufficiently close to entering the edge of the display. Moreover, as a user selects different numbered search results, the display may automatically pan smoothly from one result to the next, e.g., placing the new result in the center or near the center of the display.

The user may also press the key relating to a search result a second time (or another key, as prompted) to bring up additional information about the result, as shown in view (c). Such information may include an address of a business along with its telephone number and other contact information. Again, the telephone number may allow for click-to-dial operations-either by highlighting the number or a "call" hyperlink on the display and selecting it, or by pressing a "send" or similar button when the result is displayed.

Additional choices may also be presented to the user. For example, the user may be provided with options whose selection permits the user to receive directions to the location of the search result or from the location of the search result. The other endpoint for the directions may be selected in any appropriate manner. For example, where the mobile device is GPS-enabled or otherwise location-enabled, the directions may be computed automatically from a measured location of the device. Alternatively, the user may be asked to enter their current location, and the directions will be provided between the entered location and the location of the search result. Also, particular locations may be stored in a history list, and may thus be selected easily by a user. Additional information about a search result may also be shown, and additional options may be provided for selection by a user.

View (d) shows a subsequent search on the device, where a search history is stored. The display is similar to that in view (a), but now a recent search is available for display in a search history. Thus, a hyperlink for the search "pizza" appears on the display. This history may be helpful, for example, because it allows a user to do the same search but for different areas. For example, a traveling salesperson may love a particular restaurant chain, and may place the name of that chain into favorites. The salesperson may then repeat that search easily for any town in which the salesperson is located, and may quickly receive results to the search (particularly when an automatic location identifier generates the appropriate map). When a user selects an item from the search history, the user may be provided an opportunity to edit the item. If such editing occurs, the edited search request may be added to the history list.

FIG. 3b shows similar searching processes with more detail. In a first view, a map is displayed. A user then selects a right softkey associated by position with the "menu" overlay. Upon selected the softkey, a menu of choices is generated visually over the map, with a portion of the map show through around the menu, so that the display more accurately approximates a desktop windowed system with which users are typically aware. The user selects "1" and is provided a search box in the third view (and the menu box is removed). The box shows recent searches that the user may enter simply by using a directional key to move down to one of the searches, and then press an activation button. The user may also choose to type a new search using a URL selection or such an option.

In the example, the user enters "pizza 02138," a query that may be transmitted to a central server. The server will parse the query apart and look for local information in it. For example, the system may assume that a 5-digit number in the appropriate location of a query represents a zip code. The system may also assume that food names, when accompanied by location information such as a zip code, represent an interest in restaurants. Once the user confirms their query, such as by pushing the center of a directional button, the query may be submitted to the central server, and the results sent back. The next view shows an exemplary display for such a result. As shown, a single result has been generated in response to the search query, and it is a particular pizza parlor.

The user may be given the option to see additional detail about the search result (e.g., by pressing a key such as 1), and such detail is shown in the last display in FIG. 3b. The detail shows the address and telephone number of the particular search result. In addition, certain options with respect to the search result are provided. One of the options, for example, causes the mobile device to dial and attempt to contact the search result, such as a restaurant that takes reservations. In addition, directions relating to the location of the search result may also be provided, as described next.

Figure 4A:
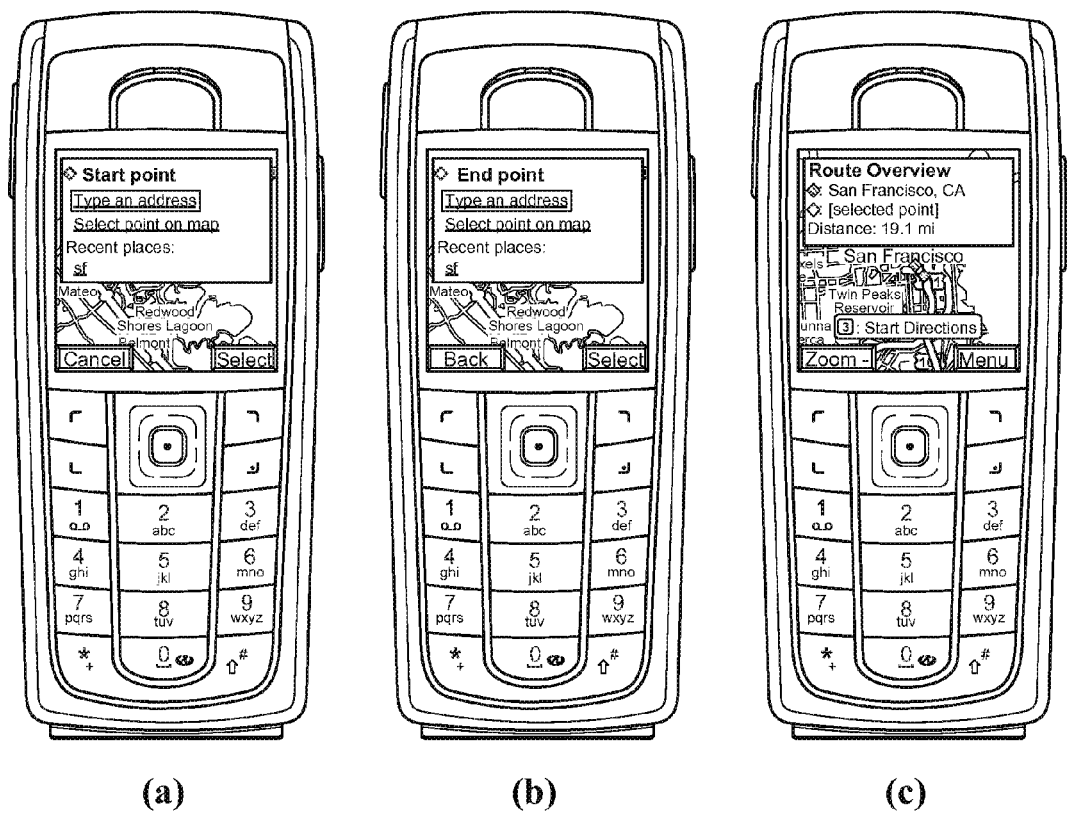
FIGS. 4a-4b show displays for a directions operation on a mobile device.
Figure 4B:
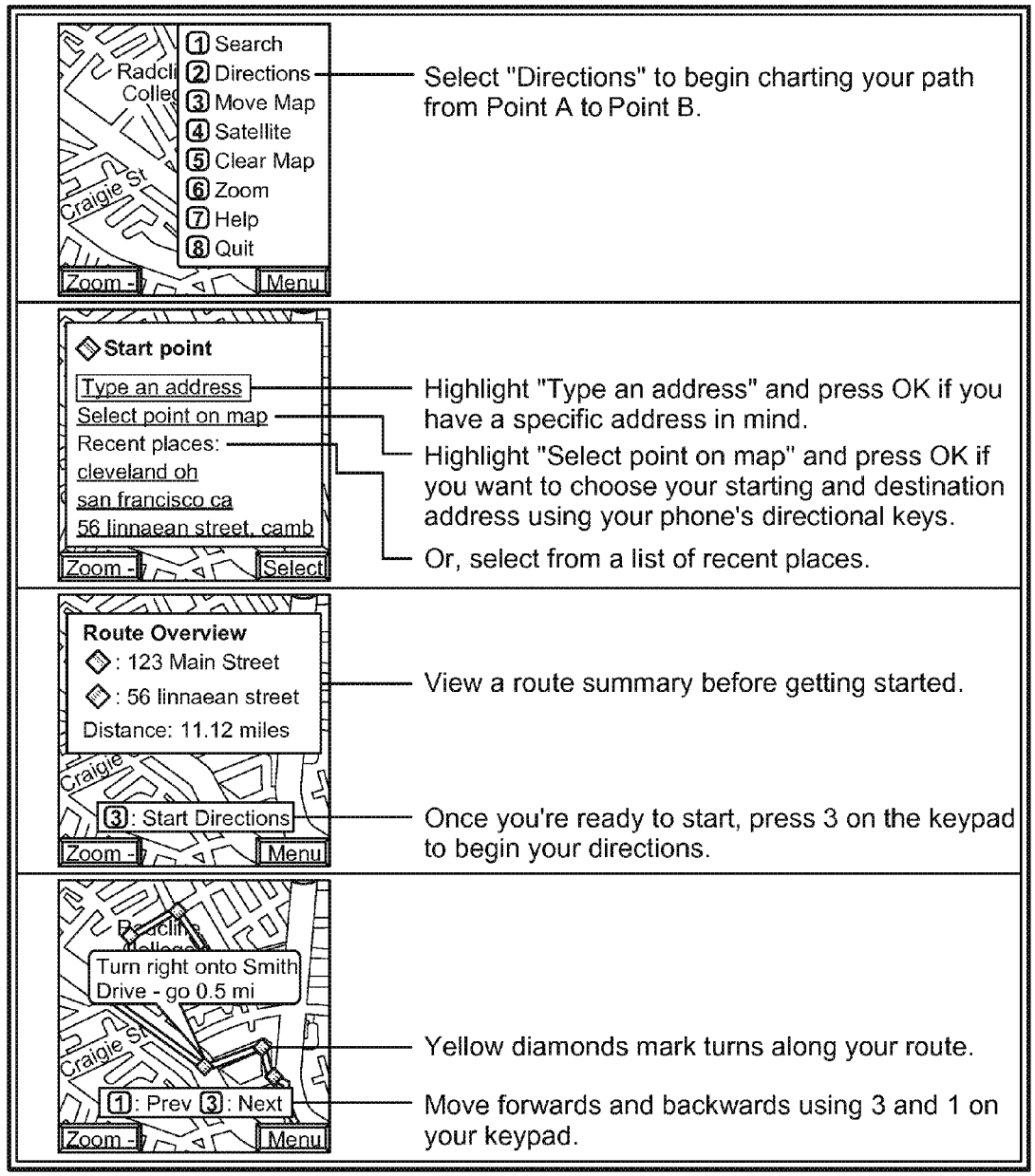

FIGS. 4a-4b show displays for a directions operation on a mobile device. Directions may be, for example, a choice under a "menu" item, along with other options like those just discussed. As just noted, a directions operation may also be readily selected from the outcome of a local search request. Directions may be shown by a line of contrasting color or weight overlaid on a map, and may also include a number of waypoints, where the illustrated path changes directions or changes from one road to another road. Other waypoints may also be provided, such as lookouts or other points of interest along a path. A user may be provided with a menu to select preferences for particular waypoints that the user would like to have displayed near a route, such as particular stores, government buildings, landmarks, scenic points, etc.

View (a) in FIG. 4(a) shows a first display for entering data for receiving directions. The view provides a user the ability to enter a starting point for the directions. In the pictured view, a user can select a point in two ways—by entering an address or similar locational information, and by selecting a point on a map. If the user chooses the first option, such as by selecting a corresponding hyperlink, the user may be provided with an empty data entry box into which an address may be entered. That address will be sent to a remote system which may then parse it and determine the address to which it refers, in preparing directions to return to the device. The user may also choose a location from a "recent places" list which stores location data and names for locations that have recently been entered into the user's device, or "favorite places" list which displays locations specifically identified by the user as favorites (much like favorite web sites in a standard web browser). If the user chooses the second option (selecting a location on a map), the dialog will be removed so that the underlying map is displayed, and the user may use map navigation (e.g., panning and zooming) as explained above to place the starting point in or near the middle of the displayed map. The user may then press the center of a navigation key to indicate a selection of the particular starting location.

Once the user has entered the starting point, he or she may enter the ending point in a similar manner to the entry of the starting point. View (b) shows a dialog for entering end point information. Note again that the device may track recently identified locations and present them as "recent places" selections, either for starting points or ending points, to permit quicker identification of a point by a user. Also, context sensitive softkeys may also be provided, such as an option (in view (a)) to cancel an attempt to receive directions, and an option (in view (b)) to go back to re-select a start point.

Once the start and end points are provided, the remote system (such as a Google backend server) may compute a route and transmit it back to the device for display. The route may be placed over the map in a particular color, with identifiers for the start and end points. For example, the start point may be a simple green icon, while the end may be a red icon. Also, the path may be in the form of a highlighted or thickened line over the suggested paths.

A dialog can initially be displayed along with the proposed directions. The dialog (see view (c) in FIG. 4a) shows a route overview, e.g., in the form of the start and end points, and a computed distance for the trip. An additional dialog may be provided showing the user which key to press to start the directions, or a user may simply scroll down through the main dialog to get to the directions. The directions may be simply short-hand statements typical of driving directions well known in the art.

A user can use the keypad (or voice commands, or even GPS readings) to traverse through the route turns, with navigational information appearing in a pop up window in much the same way as the route overview information. A user may move forward and back through a route, for instance, by pressing the 3 and 1 keys, respectively (as shown in the bottom display of FIG. 4b). The device may also display text or icons for cues to the user about this functionality.

The map may additionally animate with the actual progress along a path as a user moves from turn to turn. For example, the text indication for a waypoint may jump from one waypoint to the next, but the tiles may be panned smoothly so that a first waypoint is initially positioned near the middle of the screen and then a second waypoint is moved onto the screen (if it is initially off the screen) and then into the middle of the screen. Appropriate tiles may be retrieved, in a tile-based system, to show the map between the two waypoints. Also, the map may rotate so that the user's course on the map is always view-northward (i.e., to the top of the device).

Figure 5:
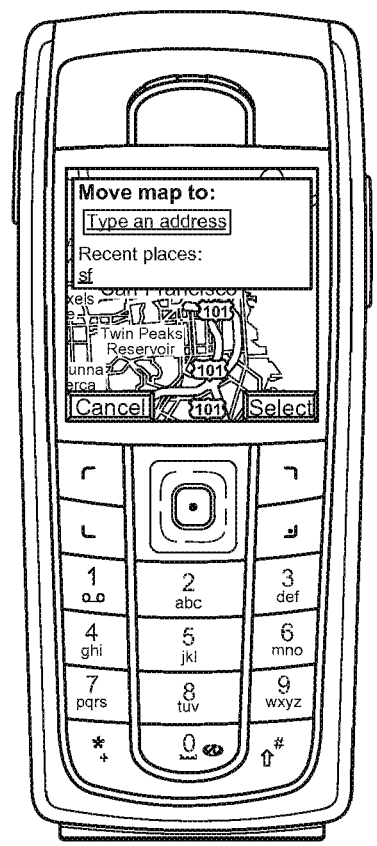
FIG. 5 shows a display for a move map dialog on a mobile device.

FIG. 5 shows a display for a move map dialog on a mobile device. This functionality allows a user to call up a move map dialog at any appropriate point when using the device, and to select a new location on which to center the map. The entry may simply include an address entered in a text entry box, as shown. Also, a history may also be maintained so that a user can simply select one of the recently used locations, without having to type an entire address.

When a map is moved, the device or the remote system with which the device is in communication may set an appropriate initial level for the map. For example, where the address is a simple street address, the zoom level may be very close. When the address is as broad as a zip code, the zoom level may be selected so as to substantially match that area.

Figure 6A:
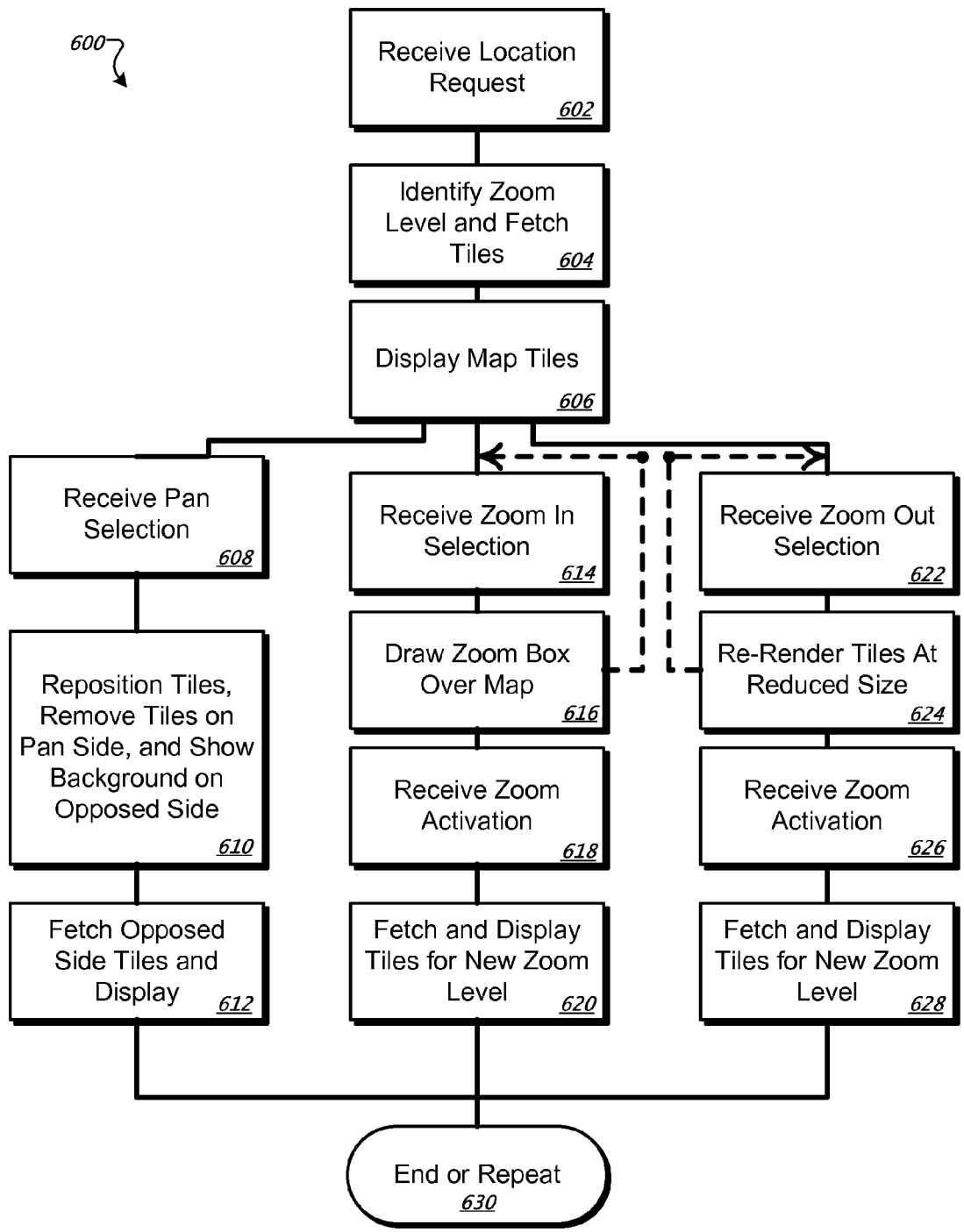
FIG. 6a is a flow chart showing actions for zooming and panning a graphical display on a mobile device.

FIG. 6a is a flow chart 600 showing actions for zooming and panning a graphical display on a mobile device. The flow chart 600 shows actions that may occur like those for rendering the views shown in FIGS. 1, 2a, and 2b above. At box 602, a location request is initially received. The request may be received directly from a user, such as by a client device, or may also be received at a server providing mapping information. At box 604, the appropriate zoom level for the request may be determined, and tiles for that zoom level may be retrieved from a database of image tiles. The tiles may be computed to be all tiles a certain distance on each side of a point, such as a location provided in the location request (which may be listed as a standard address, a GPS coordinate, or another appropriate location descriptor). At box 606, the map tiles, or a portion of the map tiles (e.g., where tiles beyond the edge of the allowable display area are clipped off) are provided to a device (where a central server selects the tiles) and are displayed on the device.

With the map displayed to a user, the user may be provided with a number of options for interacting with the map. In this example, three distinct map movement options are illustrated. A first option involves panning the map, a second option involves zooming in on the map, and a third option involves zooming out on the map.

In the first, panning, option, a user makes a selection to pan (box 608). The selection may involve, for example, pressing on one side of a directional key, or by pressing an appropriately numbered button on a telephone keypad. Such selection may cause the map to immediately move one indexed position in the direction selected (box 610). The selection may also cause the mobile device to make a request for additional tiles to fill in the new space (box 612). That new space may be a blank area on the screen or a blank area off but near the screen, such as where tiles around the screen have previously been loaded, and the pan then requires additional tiles around the newly displayed screen to be loaded in anticipation for another pan selection. Where appropriate, any newly fetched tiles may be added to the display. The fetching of tiles may also be delayed, such as to wait for a regeneration selection from a user. Such an approach may be appropriate, for example, where there is a per-communication charge for a system or where latency is large so that a single transmission is preferred only after a final decision has been made about the appropriate location for the pan. At box 630, the user is then provided an opportunity to pan again or to carry out other actions.

The second option—zooming in—occurs in response to a "zoom in" command (box 614), which may be sensed, for example, from the pressing of the center of a directional key. Upon receiving the command, a zoom box outline may be drawn over the map, such as in an area circumscribing a predetermined portion in the center of the map and having a shape that matches the shape of the overall display (box 616). The regeneration of the map at the zoomed in resolution may again occur after identification of a zoomed in level, or may await an explicit command for regeneration from the user (box 618). The regeneration, when it occurs, may happen by replacing the prior tile with new, higher resolution, tiles as the new tiles are retrieved (box 620). (The tiles may be higher resolution in that they could have more pixels, or they may have the same number of pixels, but may show less area and more detail because they show only a zoomed in view). To make the transition smoother, the original tiles may initially be upscaled, and may then be replaced with new zoomed in tiles, so that initially, a slightly blurred version of the view is shown, and is then replaced with a sharper version. Again, with the new view of the map displayed, the user may be given the opportunity to make other selections.

In the third option—zooming out—a user again starts the process by making a zoom out selection, which may occur, for example, by pressing an appropriately configured softkey, as shown above (box 622). The user's device may immediately re-render the existing tiles at a reduced size in a zoom box (as shown above), such as by removing pixels from the original tile images (box 624). Again, the activation of the zoom process may occur immediately or otherwise automatically, or may await explicit activation by the user (box 626). When the zoom is activated, the device may cause a central server to select from storage appropriate tiles at the new zoom level, and to deliver the tiles to the device for subsequent display of the tiles (box 628). The display may again be smoothed such as by gradually replacing the existing reduced tiles, with the new tiles.

Figure 6B:
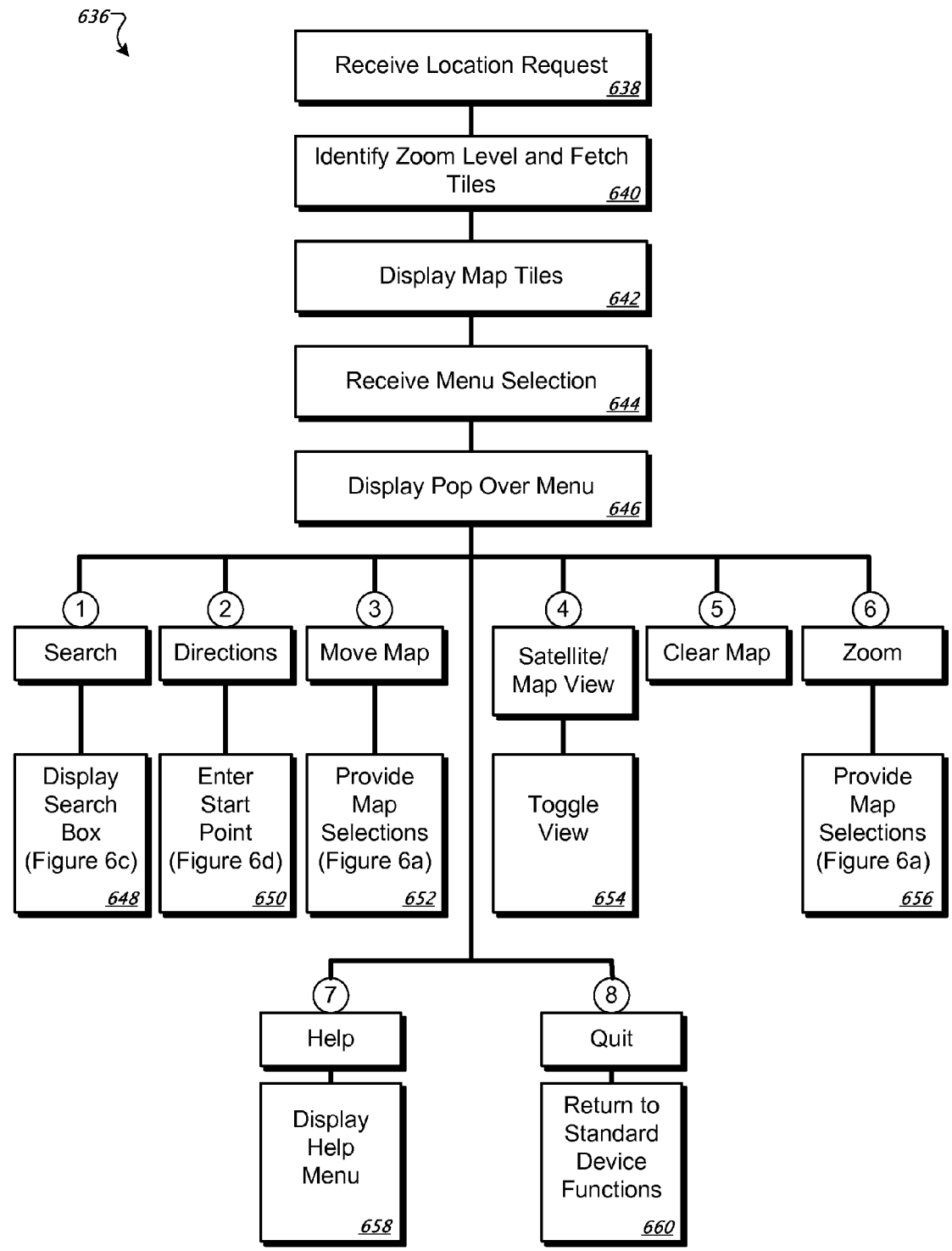
FIG. 6b is a flow chart showing actions for displaying menus on a mobile device.

FIG. 6b is a flow chart 636 showing actions for displaying menus on a mobile device. The flow chart 636 shows actions that may occur like those for rendering the views shown in FIGS. 2b, 3b, and 4b above. In the initial steps, a map is displayed for a defined area, such as by first receiving a location request (box 638). The request may be automatically generated such as by a GPS-enabled device, or may involve manual input, such as the entry by a user of a street address or selection by a user of a listed address. A zoom level for the location may then be determined and tiles for a map at that location at the appropriate zoom level retrieved (such as by a central server). The zoom level may be determined by various appropriate mechanisms, such as by determining the geographic breadth of the provided address. For example, if the address is for an entire zip code, the entire area for the zip code may be displayed, and a zoom level that will permit display of the entire zip code may be selected (box 642).

With the map displayed, a user may make a selection to have a pop over menu displayed on top of the map (boxes 644, 646). The menu may provide the user with a variety of choices. Here, each choice is indexed to a key on a telephone key pad for easy entry by a user, and is shown in flow chart 636 by a numbered circle. The first selection is "search," which will cause the search box shown in FIG. 6c to be displayed (box 648). The second selection is "directions," which will cause the directions entry box shown in FIG. 6d to be displayed (box 650). The third selection is "move map," which will cause the map selections box shown in FIG. 6a to be displayed (box 652), as will the sixth selection of "zoom." (box 656).

Other selections involve lesser interaction with the user. For example, selection of the fourth option, "satellite/map view," causes the form of information displayed in the map to change to a satellite photo if it is presently a map, and vice-versa (box 654). The label in the menu for this selection will also alternate to the choice that is opposite to what is currently displayed in the map when a selection occurs. Selection of the seventh option, "help," will cause a help menu to be displayed (box 658) in a well-known manner, which may include a searchable index of help topics. Likewise, selection of the eighth option, "quit," will return the device from the mapping application or function to its standard functions (box 660).

Figure 6C:
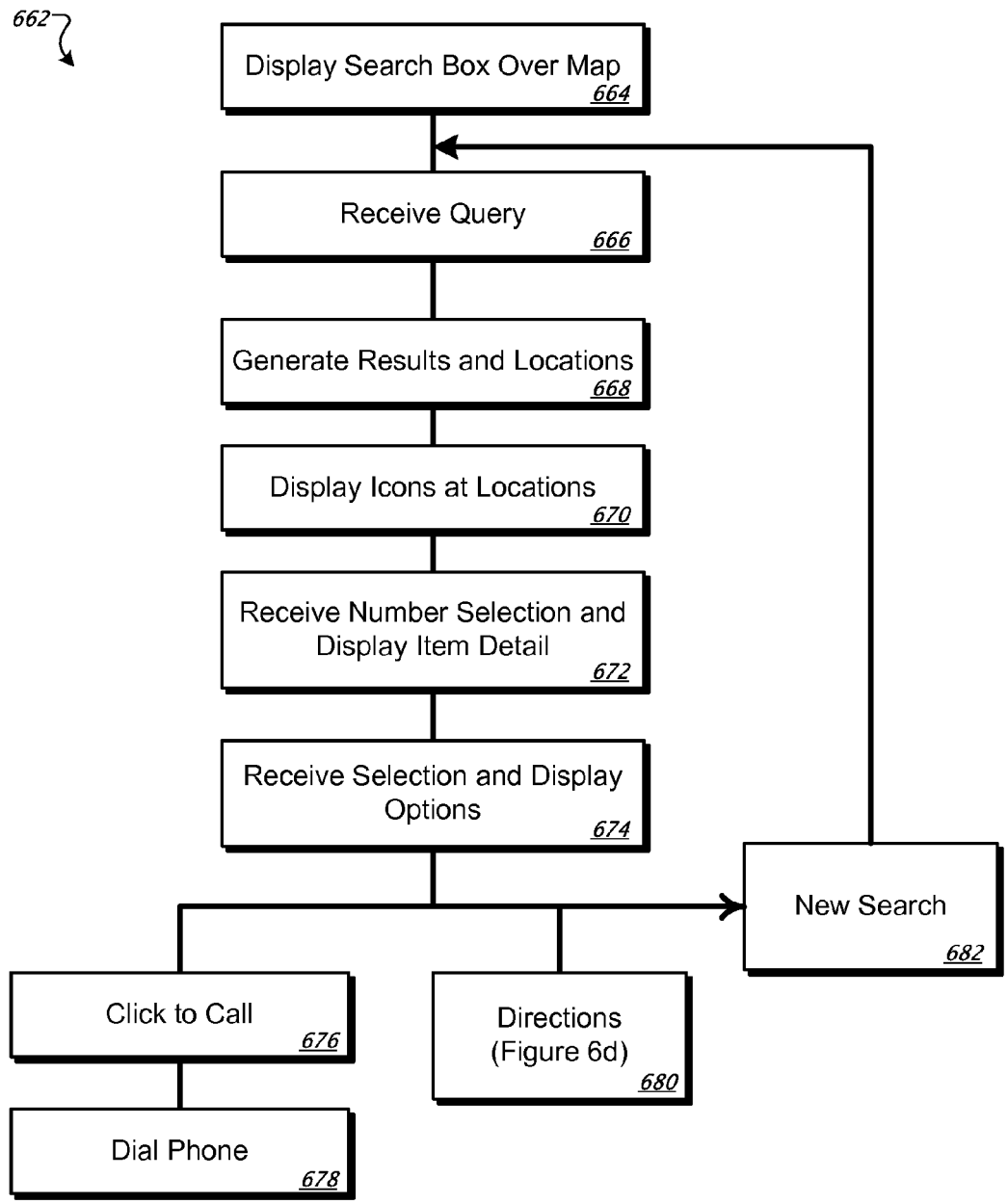
FIG. 6c is a flow chart showing the display of local search results on a mobile device.

FIG. 6c is a flow chart 662 showing the display of local search results on a mobile device. The flow chart 662 shows actions that may occur like those for rendering the views shown in FIGS. 3a and 3b above. When a user makes a selection to conduct a local search (i.e., a search whose results are connected with a location, such as a country, town, or zip code), the user's device may display a search box, and the box may be displayed over a map if the user was previously using a mapping function (box 664). The user may then provide a query to the device and the device may in turn encode the query and provide it to a central search engine server (box 666). For example, a user may enter "Chinese food" and the user's device may append a default location (such as the user's home zip code, or the coordinates for the center of the currently displayed map) and submit the combined query to a search engine's "local search" function. The server may generate search results (e.g., information about Chinese restaurants in the user's home area) along with location information (e.g., coordinates) associated with each result, and may transmit the results to the device (box 668).

Upon receiving the results, the user's device may display the results over the existing map, or may generate a new map if the results correlate to a different area. The display of the results may, to minimize clutter on the map, involve displaying icons representative of each result at or near the location of the result, if the location can be determined. Each icon may be provided with a label that corresponds to a key on the device, such as the numbers 1-9 or 0-9 for a cellular telephone (box 670). Such a correlation may make selection of one or more results for further review much easier for the user. At box 672, a user selects a numbered button corresponding to one of the displayed search results, and detail about the result is displayed, such as in a bubble pointing to the result icon.

At box 674, a user further makes a selection to see additional information about the particular result and/or to have access to selections for taking action with respect to the result. For example, the user may be provided with a clink-to-call link or icon (box 676), whose selection may cause the device to place a telephone call to a telephone number associated with the search result (box 678). The user may also choose to have directions generated from their current location (e.g., the center of the map) to the particular result (box 680). The user may also choose to conduct a new search or to edit the existing search (box 682).

Figure 6D:
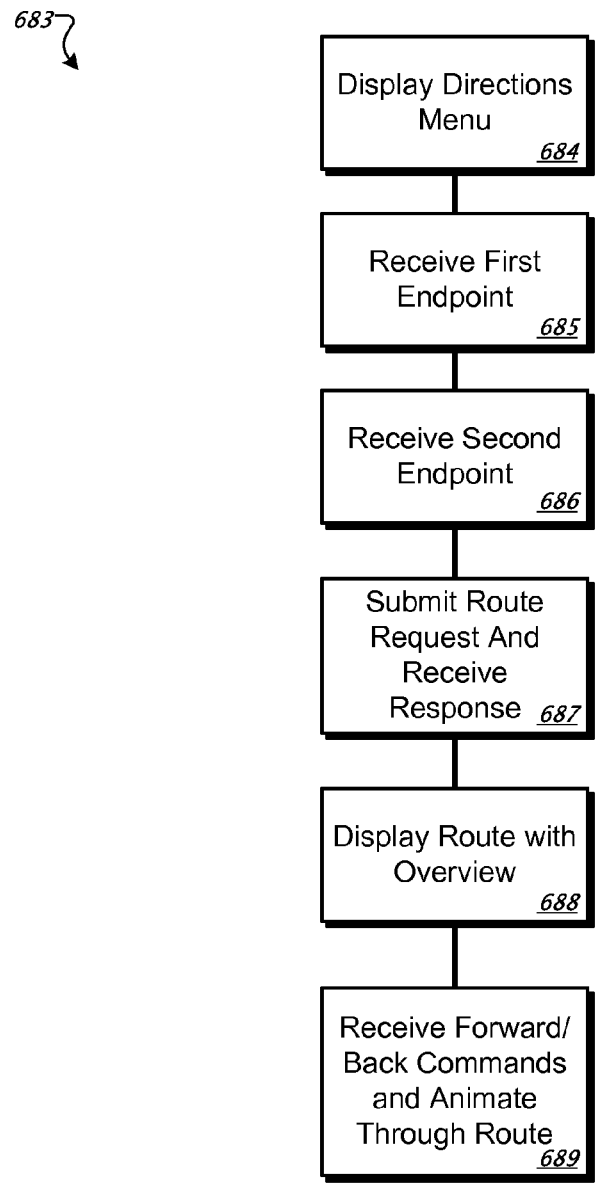
FIG. 6d is a flow chart showing actions for displaying driving directions on a mobile device.

FIG. 6d is a flow chart 683 showing actions for displaying driving directions on a mobile device. The flow chart 683 shows actions that may occur like those for rendering the views shown in FIGS. 4a and 4b above. A user may first choose to have a directions menu displayed (box 684). The user may then choose to enter first and second endpoints for the directions (boxes 685, 686). As explained above, the endpoints may be entered as the current center of the map, as an address, as a "recent places" selection, or by other appropriate mechanisms. The second endpoint may be entered in similar manners. With the two endpoints selected, the device may submit, such as to a central server, a request for generating a route, and may receive a response with route information (box 687). The route information may be provided in a manner that the route may be overlaid over a map for display to the user. As with other actions disclosed herein, such actions may be implemented using Java, Javascript, XML, or a combination such as AJAX. Indicators for discrete waypoints along the path may also be provided, so that an icon can be displayed at each waypoint, and a detail bubble may be displayed when traversing the route from waypoint to waypoint. The route may then be displayed as an overlay on a map for a portion or all of the route (which may depend on the zoom level), and an overview showing the approximate distance and travel time for the route, may also be displayed (box 688). Finally, travel along the route may be animated, either automatically (e.g., using GPS signals from the user's device as the device travels the route) or manually (e.g., as the user presses back and forward buttons to move from one waypoint to the next). As each waypoint is approached or traversed, an information bubble may pop up to show text for the directions to the next waypoint (box 689).

Figure 7:
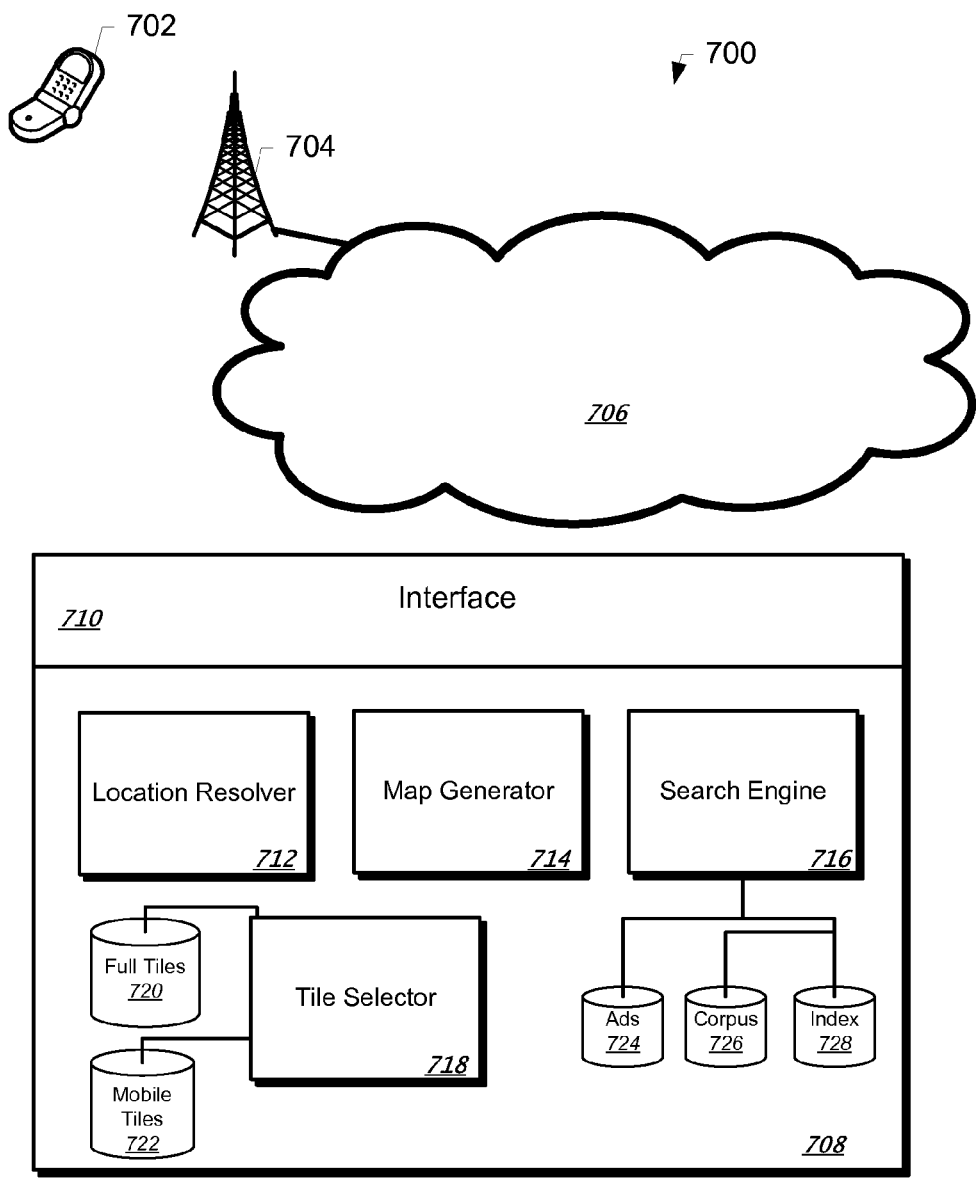
FIG. 7 shows a schematic diagram of a system for providing mapping information.

FIG. 7 shows a schematic diagram of a system 700 for providing mapping information. The system 700 may include a mapping server 708 in communication with a number of remote mobile devices, such as mobile device 702. The communication may occur through an appropriately configured network, such as the internet 706, and one or more private networks, such as cellular data network 704. Mapping server 708 may communicate through interface 710, which may include, for example, one or more servers, such as web servers. Interface 710 may receive messages from devices such as device 702, interpret the messages, and route them as appropriate to other components in mapping server 708 (which itself may include one or more servers).

A location resolver 712 in mapping server 708 may receive information such as an English-language address, parse the address, and convert it to a location in a common format, such as GPS coordinates. The location resolver may then communicate with a map generator 714, which may be configured to determine which tiles, of various tiles stored by system 700, to be displayed by device 702. For example, map generator 714 may determine an appropriate zoom level for a map and may determine which tiles associated with that zoom level are needed for a proper display of the map. Map generator 714 may then make a request to tile selector 718 for the needed tiles. The tiles may be stored, for example, in a full tiles database 720 and a mobile tiles database 722. Such storage may allow the various components of mapping server 708 to serve both mobile and desktop clients as is needed. Information such as header information may be analyzed to determine if a client is mobile or non-mobile. Similar information can be provided from both forms of clients (e.g., the location information and requests may be formatted in similar manners) so that the same modules may server both to the extent possible.

Map generator 714 may also be in communication with search engine 716, and may receive information, such as local search results, from search engine 716. The search results may also include location information associated with each search result, so that map generator 714 may generate an icon to be overlaid on a map in the correct location for the result. In addition, map generator may reformat textual information for each search result, such as by selecting information for balloons to be displayed with each result, and formatting the information appropriately.

The search engine 716 may draw on a number of databases in providing information to the device 702, either directly or through map generator 714. For example, the search engine 716 may provide a search on one or more corpuses of documents, such as stored in corpus database 726. The corpuses may be divided in several manners, such as separate corpuses for web search, local search, image search, blog search, shopping search, book search, and the like. To increase the efficiency of searching, an index database 728 may be provided to serve as an index of the documents in one or more corpuses. In addition, an ads database 724 may also be provided, and may be accessed by search engine 716 to produce advertisements that relate to entered search queries. Such advertisements may be delivered with mapping information and/or with search results, and may be displayed as appropriate on device 702.

Figure 8:
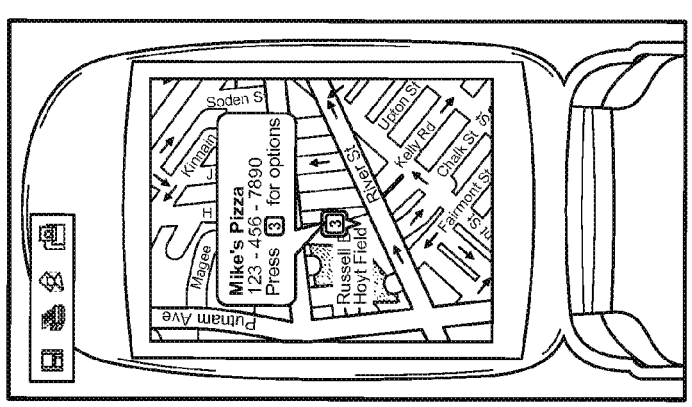
FIG. 8 shows a screen shot of a mobile local search sign up page.

FIG. 8 shows a screen shot of a mobile local search sign up page. The display shows an exemplary screen of a mobile phone, along with directions for using the system. A "Get Started" button may be selected to take the user to a screen that allows configuration of particular software for their system.

Figure 9:
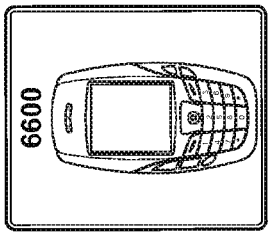
FIG. 9 shows a screen shot of a mobile local search device selection page.

FIG. 9 shows a screen shot of a mobile Local search device selection page. This particular page has been almost fully filled out by a user. In general, the leftmost of the four displayed columns is the only column shown. Once a user selects a carrier, the second column fills with phone brands supported by that carrier. The user may then select one of those brands, which will cause the third column to fill with available models from that manufacturer. Where an image of a particular model is available, the picture may be shown, as mobile phone customers often do not know the model number of their device, but can easily pick it up and compare it to the images on the screen. The user may also change the columns while filling out the form, and the dependent columns to the right will be changed to reflect, e.g., the models of phones available from the newly-selected manufacturer.

Figure 10:
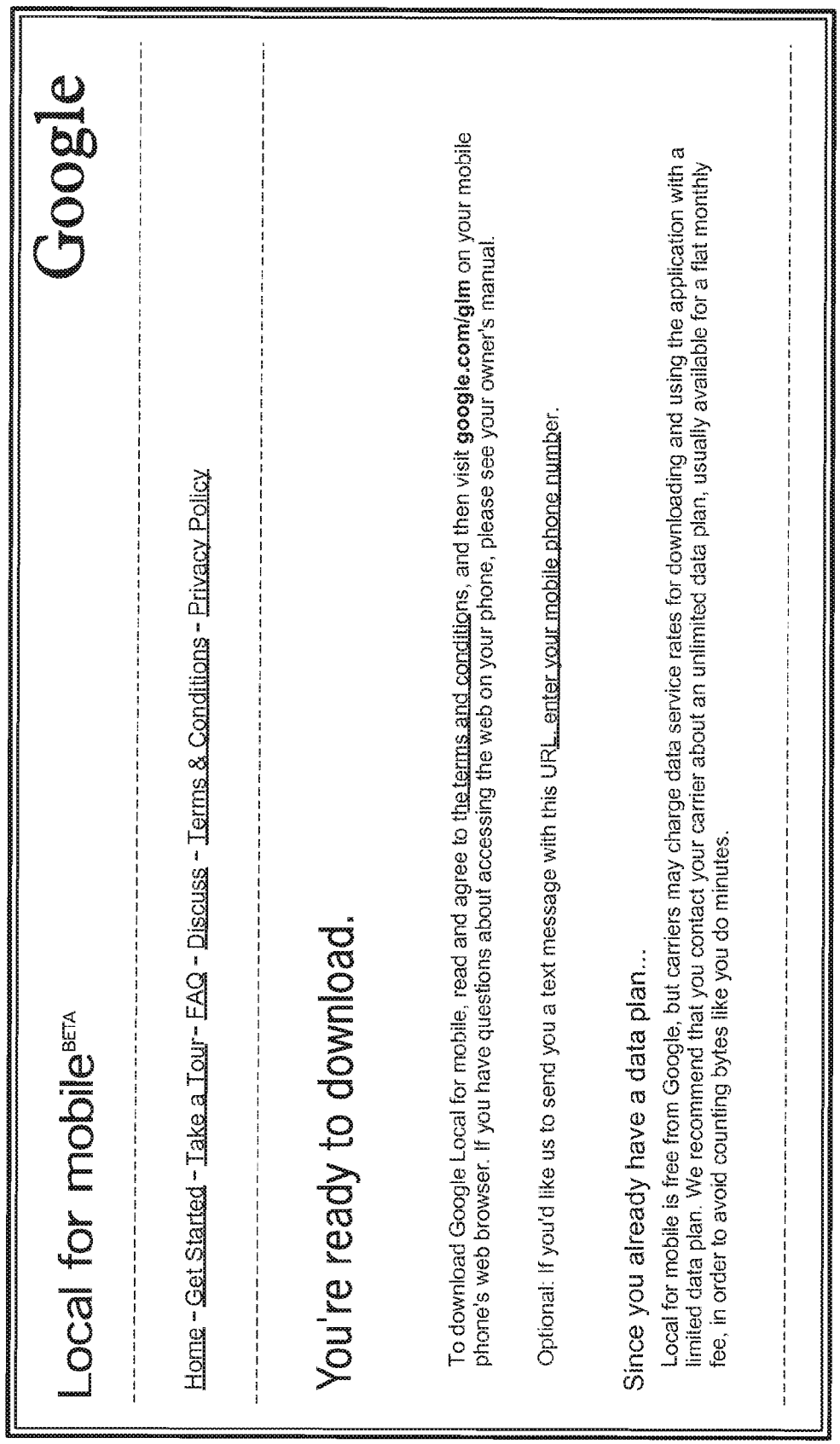
FIG. 10 shows a screen shot of a mobile local search device selection page.

FIG. 10 shows a screen shot of a mobile local search device selection page. This screen may be displayed after the user has chosen to proceed from the screen of FIG. 7. The screen explains to a user how to access the data files the user will need to use services like those described above. A subsequent visit by the user with the mobile device may result in code (e.g., for J2ME) being downloaded to the user's device.

Figure 11:
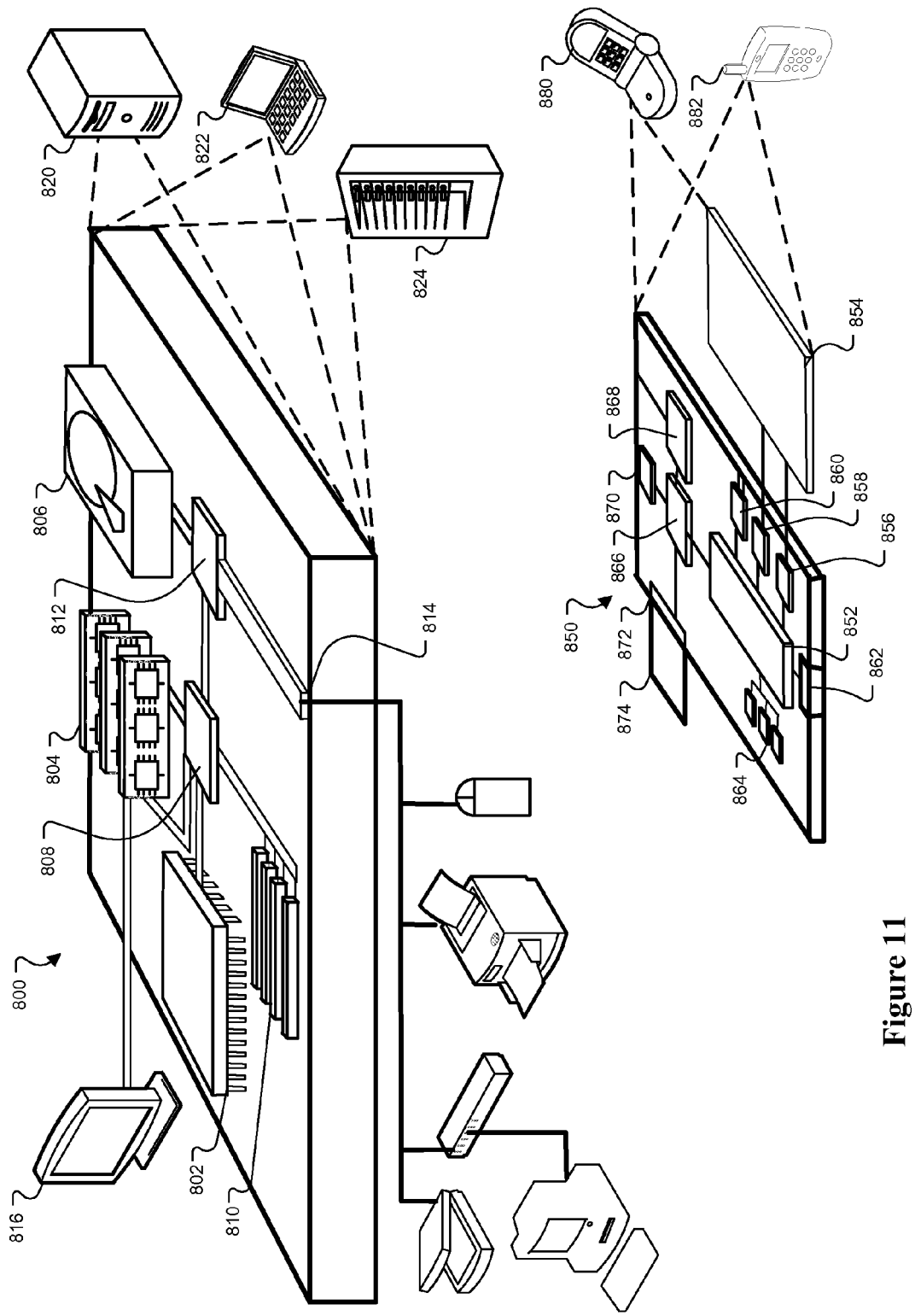
FIG. 11 shows block diagrams of general computing systems.

FIG. 11 shows block diagrams of general computing systems 800, 850. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the Figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communication audibly using audio codec 860, which may receive spoken information from a user and convert it to usable digital information. Audio codex 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the Figure. For example, it may be implemented as a cellular telephone 880. It may also be implemented as part of a smartphone 882, personal digital assistant, or other similar mobile device.

This document describes features of a user interface related to local search processes, which may be implemented in J2ME, BREW, or another applicable language or environment, such as PocketPC. In addition, although the Figures show a simple map display, the actual map may differ from that shown. For example, satellite images for comparable geographic areas may be shown instead of the map. Also, a "hybrid" display may be used, where the background is satellite images, with an overlay of streets in particular drawn colors with labels.

Also, the images displayed for mobile devices may be altered from those shown on full-featured computers. In particular, because the screens on mobile devices are generally smaller than those on full-featured computers, labels (such as street names laid over the corresponding lines that represent the streets) may be repeated more often for mobile images to ensure that the labels appear on the smaller mobile displays. The remote system may be configured so as to recognize requests from mobile devices and to respond accordingly. For example, header information in the requests may identify certain devices as mobile, and the system may use that information to route the requests to certain web servers or to employ certain formatting in a web server. For example, a system may select different tiles having more frequently repeating label information for mobile devices, as explained above. The system may also format the information using a mobile format such as WML, iMode, or xHTML.

The systems and all of the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the inventions. For example, although particular graphical representations were shown as exemplary in the figures, other representations that are helpful to a user may also be employed. Accordingly, other embodiments are within the scope of the following claims.

What is claimed is:

1. A computer-implemented mapping method, comprising:
    displaying a first map view of a geographic area on a display of a computing device;
    performing a zoom operation that comprises displaying a second map view of a zoomed geographic area that corresponds to a resized zoom box in response to:
        receiving a first voice or key-press zoom command;
        generating a zoom box of a first predetermined size on the displayed first map view in response to the received first voice or key-press zoom command;
        receiving at least one second voice or key-press zoom command; and
        resizing the zoom box to a second predetermined size on the displayed first map view in response to the received second voice or key-press zoom command.

2. The method of claim 1, wherein the second map view has a different resolution than the first map view.

3. The method of claim 2, wherein the first and the second map views comprise tiles of raster images.

4. The method of claim 3, further comprising retrieving tiles of the zoomed geographic area and replacing the displayed first map view with the retrieved tiles.

5. The method of claim 4, wherein the zoom box comprises an outline superimposed inside the edges of the first map view.

6. The method of claim 1, wherein the first zoom command is received by activation of a zoom key on a telephone device.

7. The method of claim 6, further comprising, before performing the zoom operation, receiving a movement key activation and panning the zoom box over the first map view in a direction corresponding to the activated movement key.

8. The method of claim 7, wherein the activated movement key comprises a hardware key that is physically aligned with a changeable region of the display on the computing device.

9. The method of claim 1, wherein the second map view is a zoomed-out view of the first map view.

10. The method of claim 9, wherein the zoom box comprises the first map view displayed as a reduced image centered in the display.

11. The method of claim 1, further comprising receiving a zoom initiation command, and wherein the zoom operation is performed in response to receiving the zoom initiation command.

12. The method of claim 1, further comprising waiting for a predetermined delay time interval before performing the zoom operation.

13. The method of claim 1, wherein the zoom box at the second predetermined size is of a size that corresponds to a spatial area for the geographic area that is displayed in response to receiving a third voice or key-press zoom command.

14. The method of claim 1, wherein the zoom box is superimposed over the first map view.

15. The method of claim 14, wherein the zoom box circumscribes an area of the displayed first map.

16. A tangible media carrying instructions that, when executed, perform steps comprising:
    displaying a first map view of a geographic area on a display of a computing device;
    performing a zoom operation that comprises displaying a second map view of a zoomed geographic area corresponding to a resized zoom box, in response to:
        receiving a first voice or key-press zoom command;
        generating a zoom box of a first predetermined size on the displayed first map view in response to the received first zoom command;
        receiving at least one second voice or key-press zoom command; and
        resizing the zoom box to a second predetermined size on the displayed first map view in response to the received second zoom command.

17. The media of claim 16, wherein the steps further comprise retrieving map tiles, each map tile representing a portion of the zoomed geographic area, and replacing the displayed first map view with the retrieved tiles.

18. The media of claim 17, wherein the zoom box comprises an outline superimposed inside the edges of the first map view.

19. The media of claim 16, wherein the first zoom command is received by activation of a zoom key on a telephone device.

20. The media of claim 19, wherein the steps further comprise, before performing the zoom operation, receiving a movement key activation and panning the zoom box over the first map view in a direction corresponding to the activated movement key.

21. The media of claim 20, wherein the activated movement key comprises a hardware key that is physically aligned with a changeable region of the display on the computing device.

22. The media of claim 16, wherein the second map view is a zoomed-out view of the first map view and the zoom box comprises the first map view displayed as a reduced image centered in the display.

23. The media of claim 16, wherein the zoom box at the second predetermined size is of a size that corresponds to a spatial area for the geographic area that is displayed in response to receiving a third voice or key-press zoom command.

24. The media of claim 16, wherein the zoom box is superimposed over the first map view.

25. The media of claim 24, wherein the zoom box circumscribes an area of the displayed first map.

26. A mobile computer-implemented mapping system, comprising:
    an interface to receive location information and to provide, in response, corresponding map information, the map providing a view of a geographic area centered around a location identified by the location information;
    map tile storage holding a plurality of tiles for display with the interface; and
    means for changing map information displayed by the interface in response to inputs by a user to a mobile device, wherein the inputs cause a visual preview indictor of a next map size to be displayed on a current map view, and upon selection by the user, cause a map view to be displayed that corresponds to a size of the visual preview indicator.

27. A mobile computer-implemented mapping system, comprising:
    at least one mobile device, comprising:
        an input interface arranged to receive zoom commands, including at least a first zoom command and a second zoom command;
        a display interface arranged to present map views, including at least a first map view and a second map view;
        a processor arranged to receive instructions stored in memory to
            generate a zoom box of a first predetermined size on the first map view in response to the first zoom command,
            resize the zoom box to a second predetermined size on the first map view in response to the second zoom command, and then
            send a request to perform a zoom operation to display the second map view based on the second predetermined size of the zoom box; and
    a mapping server system, comprising:
        map tile storage holding a plurality of tiles for transmission to and display on the mobile device;
        an interface arranged to receive the request and to send one or more of the tiles to the mobile device for display as the second map view; and
        a processor arranged to receive instructions stored in memory to select the one or more tiles based on the second predetermined area in the received request.

28. The system of claim 27, wherein the zoom box at the second predetermined size is of a size that corresponds to a spatial area on the first map view that is displayed as the second map view in response to the request to perform the zoom operation.

29. The system of claim 27, wherein the zoom box is superimposed over the first map view.

30. The system of claim 29, wherein the zoom box circumscribes an area of the first map view.

* * * * *